(12) United States Patent
Carty

(10) Patent No.: US 8,192,679 B2
(45) Date of Patent: Jun. 5, 2012

(54) CONTROLLED DISTRIBUTION OF NANO-SCALE SINTERING DOPANTS

(76) Inventor: William M. Carty, Alfred Station, NY (US)

( * ) Notice: Subject to any disclaimer, the term of this patent is extended or adjusted under 35 U.S.C. 154(b) by 1016 days.

(21) Appl. No.: 12/098,006

(22) Filed: Apr. 4, 2008

(65) Prior Publication Data

US 2008/0193318 A1 Aug. 14, 2008

Related U.S. Application Data

(63) Continuation-in-part of application No. 11/924,278, filed on Oct. 25, 2007.

(60) Provisional application No. 60/974,643, filed on Sep. 24, 2007, provisional application No. 60/862,881, filed on Oct. 25, 2006.

(51) Int. Cl.
B28B 1/00 (2006.01)
(52) U.S. Cl. ........................................ 264/603
(58) Field of Classification Search .................. 264/603
See application file for complete search history.

(56) References Cited

U.S. PATENT DOCUMENTS

| | | | |
|---|---|---|---|
| 4,882,304 A | 11/1989 | Novich et al. | |
| 4,978,643 A | 12/1990 | Venkataswamy et al. | |
| 5,344,738 A | 9/1994 | Kmiecik-Lawrynowicz et al. | |
| 5,580,832 A * | 12/1996 | Malghan et al. | 501/1 |
| 2004/0148868 A1 | 8/2004 | Anderson et al. | |
| 2006/0144550 A1* | 7/2006 | Batllo et al. | 164/131 |

OTHER PUBLICATIONS

Kara, F & Little, A (1996). Sintering Behaviour of Precursor Mullite Powders and Resultant Microstructures. Journal of the European Ceramic Society16, 627-635.*
Andersson, K. et al., "DLVO Interactions of Tungsten Oxide and Cobalt Oxide Surfaces Measured with the Colloidal Probe Technique", Journal of Colloid and Interface Science, (2002),246 [2], 309-15.
Xu, R. et al., "Particle Size and Zeta Potential of Carbon Black in Liquid Media", Carbon (2007),45 [14], 2806-9.
Chen, Y et al., "Dispersion Behavior of Si-C-N Nanopowders in Organic Liquids",Ceramics International, (2001),27 [1], 73-9.
Widegren, J. et al., "Effect of Acids and Bases on the Dispersion and Stabilization of Ceramic Particles in Ethanol", Journal of the European Ceramic Society, (2000),20 [6], 659-65.
Rahaman, M N., "Ceramic Processing and Sintering", 2nd Edition, Marcel Dekker, Inc., (2003).
Bergstrom, L. "Hamaker Constants of Inorganic Materials", Advances in Colloid and Interface Science, (1997),70, 125-69.

(Continued)

Primary Examiner — Matthew Daniels
Assistant Examiner — Russell Kemmerle, III
(74) Attorney, Agent, or Firm — Brannon Robinson Sowers Hughel & Doss PC

(57) ABSTRACT

A method of the controlling the chemical and physical characteristics of a body formed from powder precursors, including measuring a predetermined amount of a first generally spherical particles, adhering smaller second particles to the respective first particles to define composite particles, forming the composite particles into a green body, and sintering the green body to yield a densified body. The second particles adhered to the first phase particles are substantially uniformly distributed and a respective first particle defines a first particle diameter that is typically at least about 10 times larger than the smaller diameter defined by a respective second particle. The composite particles define a predetermined composition.

2 Claims, 9 Drawing Sheets

OTHER PUBLICATIONS

Liden, Eva et al., "Homogeneous Distribution of Sintering Additives in Liquid-Phase Sintered Silicon Carbide", *Journal of the American Ceramic Society*, (1995),1761-1768.

Hidaka, Nobuhiro et al., "Mixing Effect of Nanometer-Sized SiC Powder on Processing and Mechanical Properties of SiC Using Submicrometer-Sized Powder", *Journal of the Ceramic Society of Japan*, (2005),466-471.

Kimura, Toshio et al., "Consolidation of Alunina-Zirconia Mixtures by a Coloidal Process" *Journal of the American Ceramic Society*, (1991),625-632.

Hidaka, Nobuhiro et al., "Aqueos Processing, Hot-Pressing and Mechanical Properties of Silicon Carbide with Al2O3 and Y2O", *Journal of the Ceramic Society of Japan*, (2005),143-148.

Han, K. R., et al., "Surface Modification of Silicon Nitride Powder with Aluminum", *Communications of the American Ceramic Society*, (1996),574-576.

Garino, Terry "Heterocoagulation as an Inclusion Coating Technique for Ceramic Composite Processing", *Journal of the American Ceramic Society*, (1992),514-518.

Fisher, Matthew L., "Effect of Silica Nanoparticle Size on the Stability of Alumina/Silica Suspensions", *EBSO Host*, (2001),1-11.

Garcia, Pascual P., et al., "Heterocoagulation between SiO2 Nanoparticles and Al2O3 Submicronparticles; influence of the background electrolyte", *Colloids and Surfaces A: Physicochem Eng. Aspects*, www.sciencedirect.com,(2006),58-66.

* cited by examiner

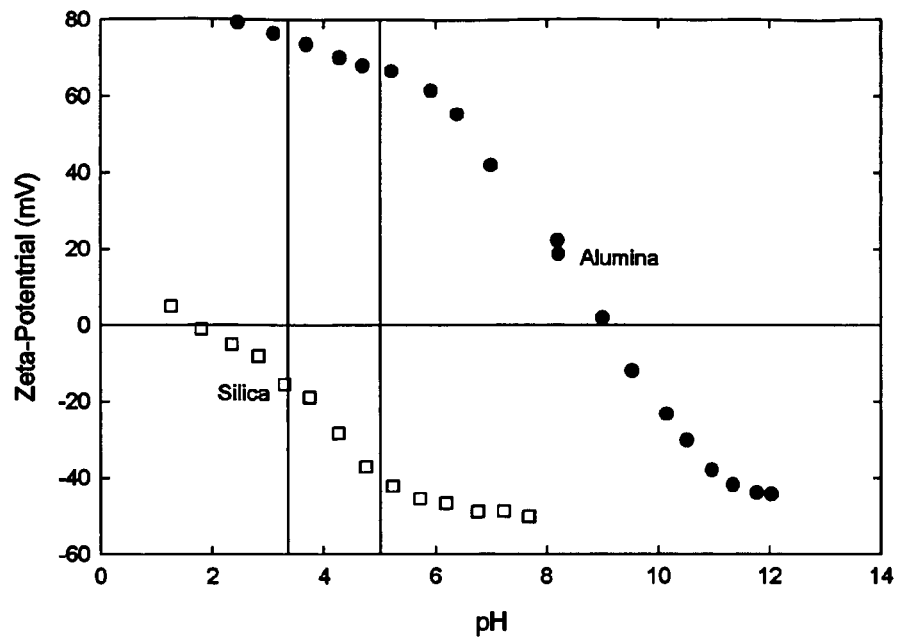
Fig. 3
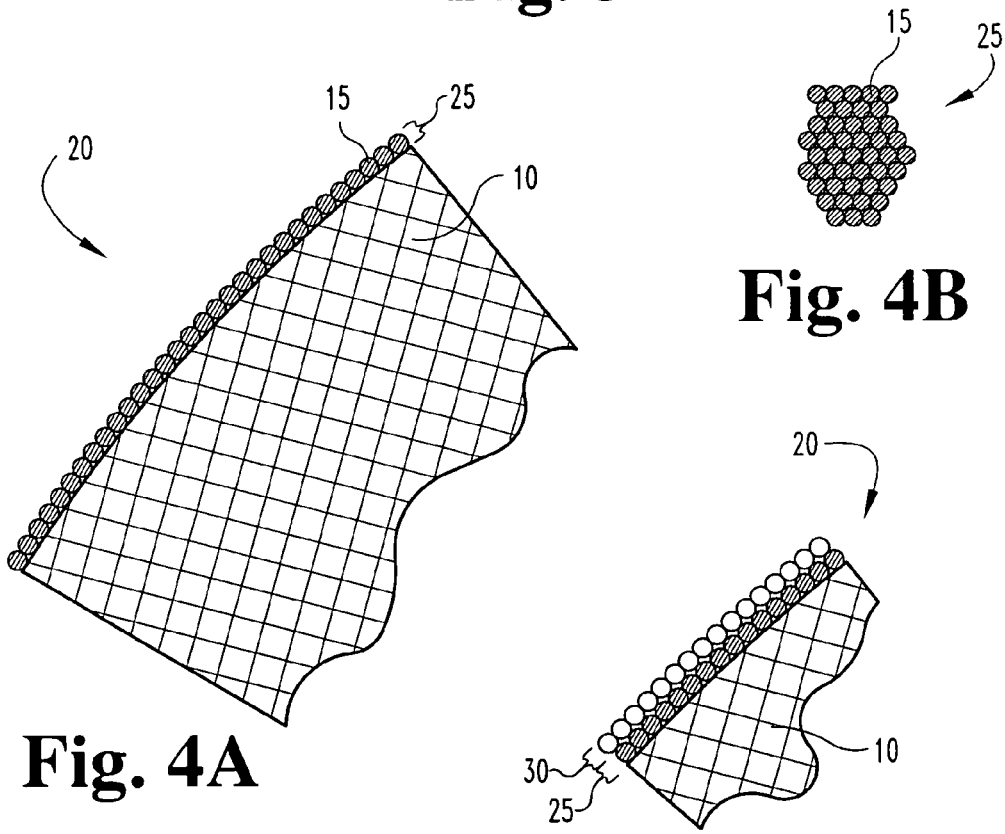
Fig. 4B
Fig. 4A
Fig. 4C

CONTROLLED DISTRIBUTION OF NANO-SCALE SINTERING DOPANTS

CROSS-REFERENCE TO RELATED APPLICATIONS

The present application is a continuation-in-part utility patent application claiming priority to, and based upon U.S. Provisional Patent Application Ser. No. 60/974,643, filed Sep. 24, 2007, and co-pending U.S. patent application Ser. No. 11/924,278, filed Oct. 25, 2007, which claimed priority to then U.S. Provisional Patent Application Ser. No. 60/862,881, filed Oct. 25, 2006, and 60/974,643, filed Sep. 24, 2007.

TECHNICAL FIELD

The novel technology relates generally to the materials science, and, more particularly, to a method for controlling the distribution of chemical components in a green and/or sintered ceramic body, cermet, metallic body or the like.

BACKGROUND

Ceramic materials are typically prepared from powder precursors and heat treated or sintered such that the individual grains solidify into a solid body. In many cases, the desired composition includes small amounts of a second composition added to enhance the sintering process, such as to decrease porosity or lower the temperature at which the body may be sintered. Small chemical additions, known as dopants, are used to enhance sintering and adjust material properties. These additions are typically added in small amounts, less than 10% and more commonly in the one to two percent level. The distribution of these dopants is typically uncontrolled or 'left to chance', insofar as it is done in such a way as to result in a non-uniform distribution of the dopants throughout the compact. Such a non-uniform distribution leads to defects in the resultant compact.

The current approach for introducing dopants falls into two general categories: salt solutions and the use of second phase particles. Salt solutions are initially perfectly mixed, as the salt concentration within the solution should be ideally uniform. As water evaporates from the particle compact, or even within a droplet during a spray-drying process, the salt migrates with the water in the packed particle structure. The last pocket of liquid, be it in the meniscus between two particles or a reservoir within an agglomerate, is where the salt will concentrate. Once the solubility limit is reached, the salt precipitates. If more than one dopant is used, then the precipitation process occurs sequentially, with the lowest solubility salt precipitating first, etc. This can, and does, typically lead to large-scale segregation of the dopants.

In systems which use second phase particles, the dopant particles are often of similar size as the primary material particles. In some cases, the dopants are often several orders of magnitude larger, leading to gross segregation as the system is being milled or mixed. Large dopant particles inherently lead to large-scale segregation and, typically, to having significant excess dopant in the system. Because of large-scale segregation, additional dopant is used to compensate for segregation. This is often leads to inferior or variable material properties after sintering. Thus, there remains a need for a process that more uniformly distributes sintering dopants throughout the sintered body.

Another area of ceramic processing suffering form inhomogeneous distribution of components is wash-coats. Current technology for wash-coats consists of a mixture of ceramic particles, including typically two or more of the following: alumina, silica (quartz and cristobalite), zirconia, and colloidal silica (amorphous silica). All of these particles have different surface chemistries in water, meaning that the surface charges can be opposite on different particles and of different magnitudes. This leads to severe problems in maintaining suspension stability over the lifetime of the slurry pots. When the suspension becomes unstable, often indicated by excessive settling or gelation of the suspension, the pot is discarded, often meaning that several tons of material are simply dumped. Having uncontrolled surface chemistries means that the pH of the suspension shifts and therefore must be adjusted on a daily basis.

One source of loss for investment casting systems is the failure of the shell during the cast, resulting in ceramic shell fragments in the molten metal, resulting in the rejection of the cast and significant financial loss. Slurry processing of the powders to create the composite grains ensures excellent mixing of the component powders, resulting in a significant improvement in the strength of the ceramic shell, thus potentially reduces losses associated with shell failure.

Thus, there is a need for a powder processing technique for producing two-phase ceramic powder systems that do not suffer from uneven distribution of phases and material (both chemical and physical) properties. The present novel technology addresses these needs.

SUMMARY

The present novel technology relates generally to ceramic powder processing, and, more particularly, to a method for controlling the distribution of mixtures of ceramic powders on a small scale. One object of the present novel technology is to provide an improved ceramic material. Related objects and advantages of the present novel technology will be apparent from the following description.

BRIEF DESCRIPTION OF THE DRAWINGS

FIG. 3 schematically illustrates the measured zeta-potential of micron-sized silica and alumina particles as a function of pH in an aqueous medium.

FIG. 4 is a schematic view of the relative sizes of the alumina and colloidal silica (coating) particles.

DETAILED DESCRIPTION OF THE PREFERRED EMBODIMENT

Figure 1A:
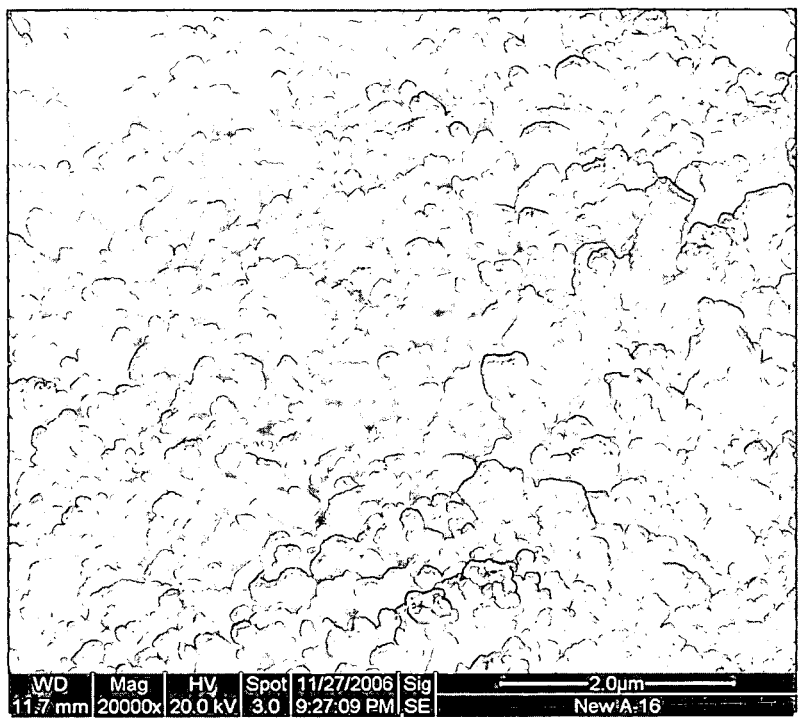
FIG. 1 is a scanning electron micrographs illustrating uncoated alumina (left) and colloidal silica-coated alumina (right).

For the purposes of promoting an understanding of the principles of the novel technology, reference will now be made to the embodiments illustrated in the drawings and specific language will be used to describe the same. It will nevertheless be understood that no limitation of the scope of the novel technology is thereby intended, such alterations and further modifications in the illustrated device, and such further applications of the principles of the novel technology as illustrated therein being contemplated as would normally occur to one skilled in the art to which the novel technology relates.

The present novel technology is illustrated in FIGS. 1A-6 and relates to a method for controlling the distribution of dopants in a sintered body by coating a comparatively large sinterable grain 10 with a substantially smaller grain 15 of an alternative chemistry, thus producing a composite grain 20. The larger particle 10 is referred to as the primary matrix particle and is typically the major component of the to-be sintered ceramic or metal body. The colloidal properties of the composite grain 20 would be controlled by the properties of the smaller, secondary particle shell or coating 25. In systems that have more than one dopant, a situation that is increasingly more common in the ceramic world, either mixed-composition coatings 25 or consecutive coatings 30 may be applied to the primary matrix particle 10.

Small chemical additions, known as dopants, are used to enhance sintering and adjust material properties. These additions are typically added in small amounts, less than 10% and more commonly in the one to two percent level. The distribution of these dopants is typically left to chance, leading to clustering of the dopants and a non-uniform distribution of the dopants throughout the sintered body or compact.

According to the present novel technology, a composite ceramic or other refractory material matrix grain 20 (typically 10-50 µm in diameter) is concentrically coated with a fine-sized, typically nano-scaled, grain of an alternative composition 15, such as an alumina grain 10 coated with colloidal silica grains 15 (see FIG. 1). The composite grains 20 thus exhibit the surface properties of the coating 25 rather than the inner core or primary matrix particle 10, eliminating multiple surface chemistries and promoting a substantial increase in the suspension stability. This configuration also reduces or eliminates the common problem of phase separation and agglomeration of dopant particles 15.

Overview: As the present novel technology relates to the agglomerating of small particles 15 of a first chemistry onto larger particles 10 of a second, different chemistry, the distribution of the smaller particles 15 can be much more uniform and controllable. The result is an engineered particle 20 that consists of selectively agglomerating an ideally-sized, typically ceramic, matrix grain 10 (such as alumina in this example) with a nano-scale particle 15 of another material (such as nano-scale silica particles in this example), thus creating a nano-scale coating 25 over the matrix grain 10 to define a composite particle 20. The composite particle 20 and the method of its production exploits differences in surface chemistry, either naturally occurring (as in the case of alumina and silica) or induced through the use of pH, organic acids and/or bases, surfactants, or dispersants, etc.

Figure 1B:
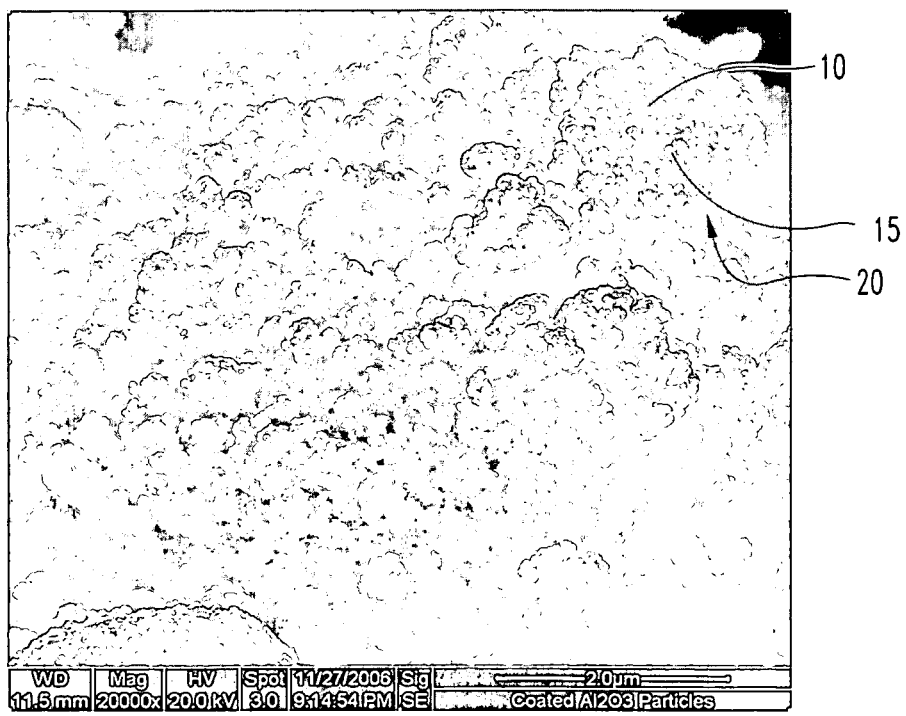
Figure 2B:
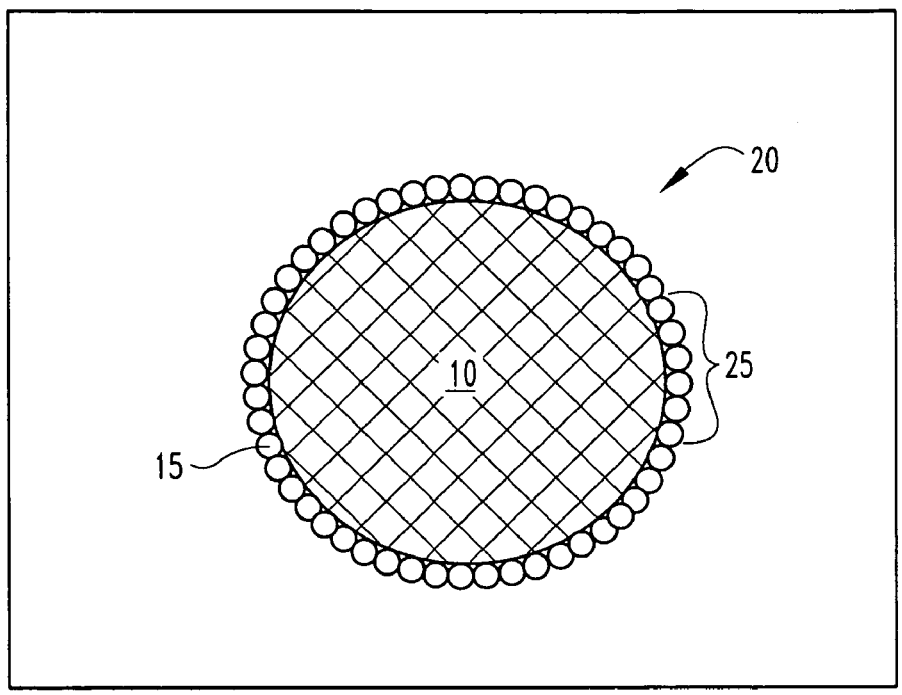
FIG. 2B graphically illustrates a composite particle formed from the blended suspension of FIG. 2A.
Figure 2A:
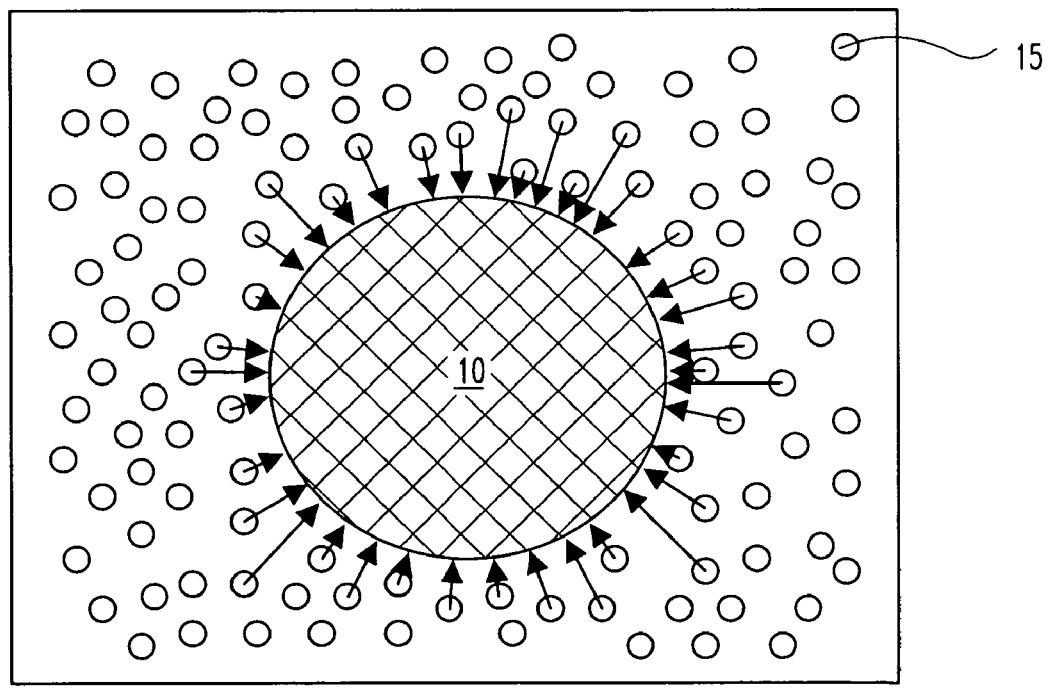
FIG. 2A graphically illustrates a suspension of alumina and colloidal silica, both at pH of 3.0-4.5 (±1.0), mixed together according to a first embodiment of the present novel technology.
Figure 6:
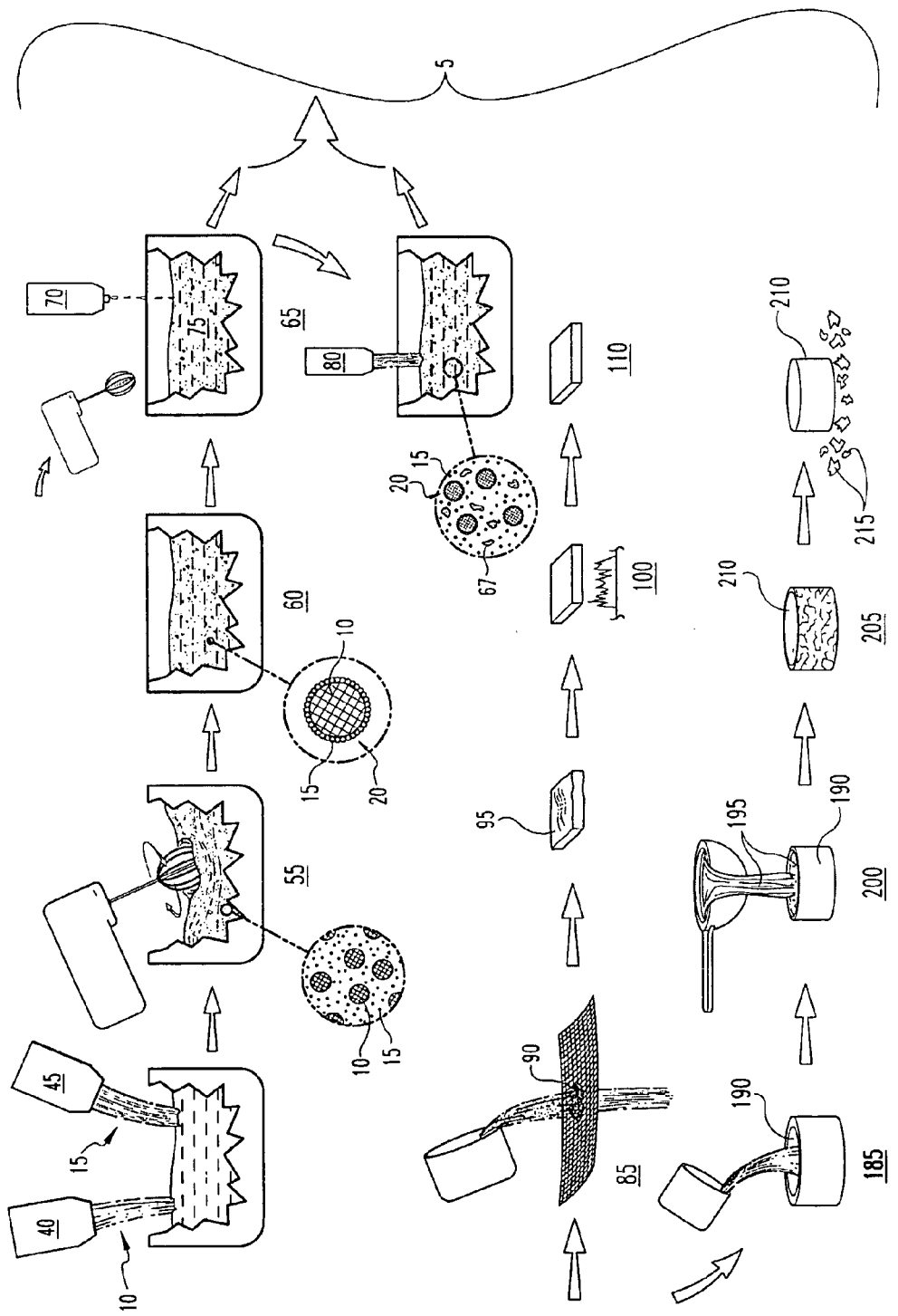
FIG. 6 graphically illustrates one embodiment of the present novel technology, an investment casting process utilizing heterocoagulated composite particles.

As illustrated in FIG. 2, in the system 5 of alumina base particles 10 coated with nanoscale silica particles 15, pH is typically used to govern the agglomeration of silica particles 15 on an alumina particle 10, resulting in a coated particle 20 that now appears to look, in a colloidal sense, like the silica particles 15. The process is that individual suspensions 40, 45 of particulate alumina 10 and colloidal silica 15, maintained at an appropriate pH (typically between pH 3.0 to 5.0), are blended together 50, typically with agitation 55, to allow the silica particles 15 to heterocoagulate 60 on the surface of the alumina particles 10 (FIGS. 1 and 6).

This heterocoagulation 60 is driven by the opposite surface charges between the alumina particles 10 and the colloidal silica particles 15—alumina is positively charged in this pH range, while colloidal silica is negatively charged (see FIG. 3). After coagulation, the pH is adjusted 65, typically through the addition of a pH modifier or buffer 70, such as NaOH, $NH_4OH$, or the like, to a pH of between about 7.0 and about 9.0, simultaneous with vigorous agitation to prevent localized regions of excessively high pH, to yield a stable suspension 75. Agitation can be accomplished a variety of ways. The increase in pH yields a uniformly negative charge on the colloidal silica coating 25. It is typically advisable to avoid allowing the pH to exceed pH=9.0, as this has the potential to rapidly degrade the suspension stability and consequently the pot lifetime.

The amount of silica 15 necessary to coat the alumina particles 10 can be calculated based on a hexagonal close-packed array of spheres (see FIG. 4C), although this may over-estimate the coating efficiency. It is typical that excess colloidal silica 15 be provided to ensure that all of the alumina particles 10 are coated. The presence of excess colloidal silica 15 typically does not affect the long-term stability of the suspension 75.

It should also be noted that the nano-particle coating 25 does not significantly increase the size of the alumina particle 10, as illustrated schematically in FIG. 4B (and also evident in FIG. 1B). Another approach would be to perform the heterocoagulation step followed by the addition of a cationic polyelectrolyte 80, such as tetraethylamine (TEA) or a similar organic base, to impart a positive surface charge on the composite particles 25 (with the colloidal silica surface). The advantage of the TEA (or similar) approach is that the system 5 will not be sensitive to cations in solution, since the surface charge will be positive instead of negative (as would be imparted by the high-pH approach). It is similarly emphasized, however, that the pH typically be constrained below about 9.0 to ensure long-term stability of the alumina particles 10, although this is less urgent in this case.

Similar charge behavior would be expected of other oxides, carbides, nitrides, or metallic particles in an aqueous medium. The opportunity for heterocoagulation 60 is facilitated by opposite surface charges on the particles 10, 15. In the event of similar surface charge as a function of pH, the use of a surface active agent 80 (such as polyelectrolytes, organic acids, or ionic surfactants) can be employed to alter the surface charge on one of the particles 10, 15 to facilitate heterocoagulation 60. Once the coating process is complete, the charge on the composite particle 25 may then be changed, either by controlling the suspension pH or by the addition of a surface active agent 80, to make the composite particle 20 similarly charged to the primary particle 10 to prevent unwanted agglomeration. For example, the heterocoagulation step 60 may be followed by the addition of a cationic polyelectrolyte 80, such as tetraethylamine (TEA), to impart a positive surface charge on the composite particles 20 (as in the example of alumina particles 10 coated with the colloidal silica particles 15). The advantage of the TEA (or similar) approach is that the resultant suspension 75 will not be sensitive to cations in solution, since the composite particle 20 surface charge will be positive instead of negative (as would be imparted by the high-pH approach).

Composite particles 25 may be extracted 85 from the suspension 75 by any convenient means to provide powder precursors 90 for use in forming green bodies 95. The green bodies are typically formed via any convenient powder processing technique and may then be fired 100 to yield sintered bodies 110.

Controlling Dopant Levels:

Dopant levels can be precisely controlled by the ratio of the size of the dopant particle 15 to that of the primary matrix particle 10. Typically, the dopant particle 15 is sized to be about ten times smaller than the primary matrix particle 10, and a ratio of about 100:1 is even more typical. Through colloidal techniques, specifically the use of stable suspensions 40, 45 controlled either by pH or by the addition of surface active agents 80, agglomeration of the smaller particles 15 is avoided. Furthermore, the use of stable suspensions 40, 45 promotes mono-layer coverage of the dopant particles 15 because the dopant particles 15 that remain in suspension would have a limited driving force for agglomeration on a similarly-charged particle surface.

As the ratio of particle size increases, the potential for extremely small dopant levels becomes possible. For example, if the primary matrix particle 10 were ten (10) microns in diameter (and assumed to be generally spherical), and the dopant particles 15 were twenty (20) nm in diameter, it would be possible to uniformly distribute a dopant level of approximately 0.7% if each primary matrix particle 10 were coated. If the primary matrix particles 10 were 1.0 micron in diameter for the same 20 nm dopant particle 15, the calculated dopant level would be 7.2%. The effect of primary particle size to dopant particle size is tabulated in Table I and illustrated in FIG. 5. These calculations assume that the particles 10, 15 are spherical and also assume a close-packed array of secondary articles 15 on the surface of the primary matrix particle 10.

TABLE 1

Example dopant levels in volume percent as a function of primary matrix particle size (D) and dopant particle size (10 nm, 20 nm, or 50 nm) assuming mono-disperse spherical particles.

| | Dopant Particle Size | | |
|---|---|---|---|
| D | 10 nm | 20 nm | 50 nm |
| 0.200 | 18.15 | 36.30 | 90.75 |
| 0.500 | 7.23 | 14.45 | 36.13 |
| 1.00 | 3.62 | 7.24 | 18.11 |
| 2.00 | 1.82 | 3.63 | 9.08 |
| 5.00 | 0.72 | 1.45 | 3.61 |
| 10.0 | 0.36 | 0.72 | 1.81 |
| 20.0 | 0.18 | 0.36 | 0.91 |
| 50.0 | 0.07 | 0.14 | 0.36 |
| 100 | 0.04 | 0.07 | 0.18 |
| 200 | 0.02 | 0.04 | 0.09 |

If smaller dopant levels are required for a given ratio of primary matrix particles 10 and dopant particles 15, a portion of the particles 10 may be coated and the resultant composite particles 20 may then be blended with uncoated primary matrix particles 10. For example, a blend of 50% of 1.0 micron primary matrix particles 10 coated with 20 nm dopant particles 15 to yield composite particles 20 blended with 50% uncoated primary matrix particles 10 would produce a dopant level of 3.6%. It is evident from these discussions that practically any dopant level is possible, ranging from very small (less that 0.1%) to several percent, and even as high as 50% (additions above approximately 15% are not typically considered dopants, but higher addition levels are clearly possible).

If more than one dopant is required, as is common for many ceramic and metal materials, blends of coated primary matrix particles 20, for example some coated with dopant "A" and some coated with dopant "B", can be produced in the appropriate ratio to uniformly distribute the dopant levels of the two components. If lower dopant levels are desired, these blended particles 10, 20 may be further blended with uncoated primary matrix particles 10 to tailor the dopant chemistry uniquely.

This process is also applicable to the use of several dopants. That is, this technique is not limited to single dopants, or systems requiring two, but could be used for multiple dopants. It is also feasible to concentrically apply the dopant coatings 25, through the appropriate use of colloidal behavior.

The present novel technology represents an excellent opportunity to control the dopant concentration and distribution within ceramic and metallic sintered particle systems. There are a number of potential ceramic systems which would be applicable. These include, among others:
   i. $Al_2O_3$ (dopants: MgO, $Y_2O_3$, $TiO_2$, $SiO_2$, glasses, etc.)
   ii. $ZrO_2$ (dopants: $Al_2O_3$, MgO, CeO, $Y_2O_3$, etc.)
   iii. ZnO (dopants: $Bi_2O_5$, CoO, NiO, $SbO_2$, $B_2O_3$, etc.)
   iv. Electronic ceramic materials (ferroelectrics, capacitors, piezoelectrics, etc.)
   v. Diamond (dopants, such as refractory metals that form carbides): W, Mo, Ta, Nb, Ti, Co, etc.)
   vi. SiC (dopants: C, Si, $Al_2O_3$, MgO, $TiO_2$, etc.)
   vii. WC, cemented carbides (dopants, Co, Ni, etc.)
   viii. $Si_3N_4$ (dopants: $Y_2O_3$, $Al_2O_3$, SiC, C, Si, etc.)

While the above discussion relates specifically to coatings 25 formed on small, generally spherical particles 10, the particles 10 may likewise be of non-spherical shape. Further, the coatings may be formed over larger bodies or entities 10, such as metallic catalyst or catalyst support bodies 10 (such as for hydrocarbon cracking or exhaust gas regeneration) and the like. For example, a catalyst support body 20 may be formed, such as from a powder precursor, by measuring a predetermined amount of a first particulate precursor material 10 such as described above and forming the same into a body 10, controlling the pH of the body 10 such that it has a first charge, and adhering a plurality of second phase particles 15 to the body 10 to define a coated body 20. The second phase particles 15 would have a second, opposite charge to the body under these pH conditions, similarly as described above, and would thus be substantially uniformly distributed. The pH of the coated body 20 may then be changed such that it would now carry a first charge.

In another embodiment, the present novel technology relates to a wash-coat system 5 including an engineered grain that is of uniform surface chemistry, eliminating the competing chemistry problem and offering the potential for much greater stability. The pH stabilized suspension 75 described hereinbelow produces a composite particle 20 that is negatively charged in suspension. This has the advantage of simplicity and ease of maintenance, but may also be relatively sensitive to free cations in solution, such as $Al^{3+}$, $Ca^{2+}$, $Mg^{2+}$, $Na^+$, $K^+$, $NH_4^+$, and the like. In some systems 5 this sensitivity will not be a problem, depending on factors such as water chemistry, dissolution kinetics of the suspended particles, impurities introduced by the coating of the casting molds, and the like. In systems 5 where such sensitivity poses issues, a cationic polyelectrolyte or like surfactant 80 may be added to impart a positive charge to the shell 25, yielding a colloidal system 5 that is insensitive to cations in solution. This system 5 is likewise more sensitive to anions, such as $SO_4^{2-}$, $Cl^-$, $NO_3^-$, etc., but these ions are less common and can be more easily avoided.

Additionally, the system 5 can be readily tailored for other applications. The description below is again focused on particulate alumina particles 10 with a colloidal silica coating 25; however, other similar systems are contemplated, such as for zircon particles 10 with colloidal silica shells 25, quartz/cristobalite grains 10 with colloidal alumina coating 15, and the like. Essentially, the novel technology is applicable to any system 5 in which the surface chemistries vary significantly with pH. It is even possible that a dual coating 30 (one coating 25 on top of another coating 25 on a matrix grain 10) may be employed.

In this embodiment, as with the previously discussed embodiment, the present novel technology relates to a method of producing a granular ceramic or metallic composite 25 by coating a comparatively large base ceramic or like grain 10 with a substantially colloidal particle 15 of an alternative chemistry to thus produce a composite grain 20 (as illustrated schematically in FIG. 1 for alumina and silica). The surface properties of the composite grain 20 are then governed by the surface properties of the material 15 making up the shell 25. A specific example would be alumina grains 10 coated with colloidal silica grains 15. The composite grains 20 thus possess the surface properties of the coating material 15 rather than the matrix particle 10, eliminating multiple surface chemistries, and promoting substantial improvement in the suspension stability to thus extend the lifetimes of so-produced coating slurries 75, such as in the investment casting industry. Further, by grading the particle size and incorporating either an intermediate-sized or larger cristobalite particle 67 into the mixture, a wash-coat and/or stucco system 77 may be developed that promotes automatic cracking and destruction of the coating during the cooling of a cast metal piece formed therein by exploiting the β- to α-cristobalite inversion (which typically occurs at 225-250° C.).

A high-performance and suspension stable ceramic grain 20 is thus produced for investment casting wash-coats. For example, the method may be used to produce stucco-coats for investment casting molds. An engineered grain 20 is produced by selectively agglomerating an ideally-sized ceramic matrix grain 10, such as alumina, with a nano-scale particle 15 of another material, such as silica. The result is a nano-scale coating 25 that eliminates multiple surface chemistries and allows the suspension properties to be maintained and stabilized over time, thus substantially prolonging the suspension lifetimes. In the vernacular of the investment casting industry, this technology extends the lifetimes of the slurry "pots". The incorporation of cristobalite as a third particle 67 would not undermine the suspension stability benefits obtained from the colloidal silica coating 25 on alumina particles 10, since the surface chemistry of colloidal silica and cristobalite are essentially identical. In other words, both are pure silica surfaces and have nearly identical reactions with water when in suspension.

Figure 5:
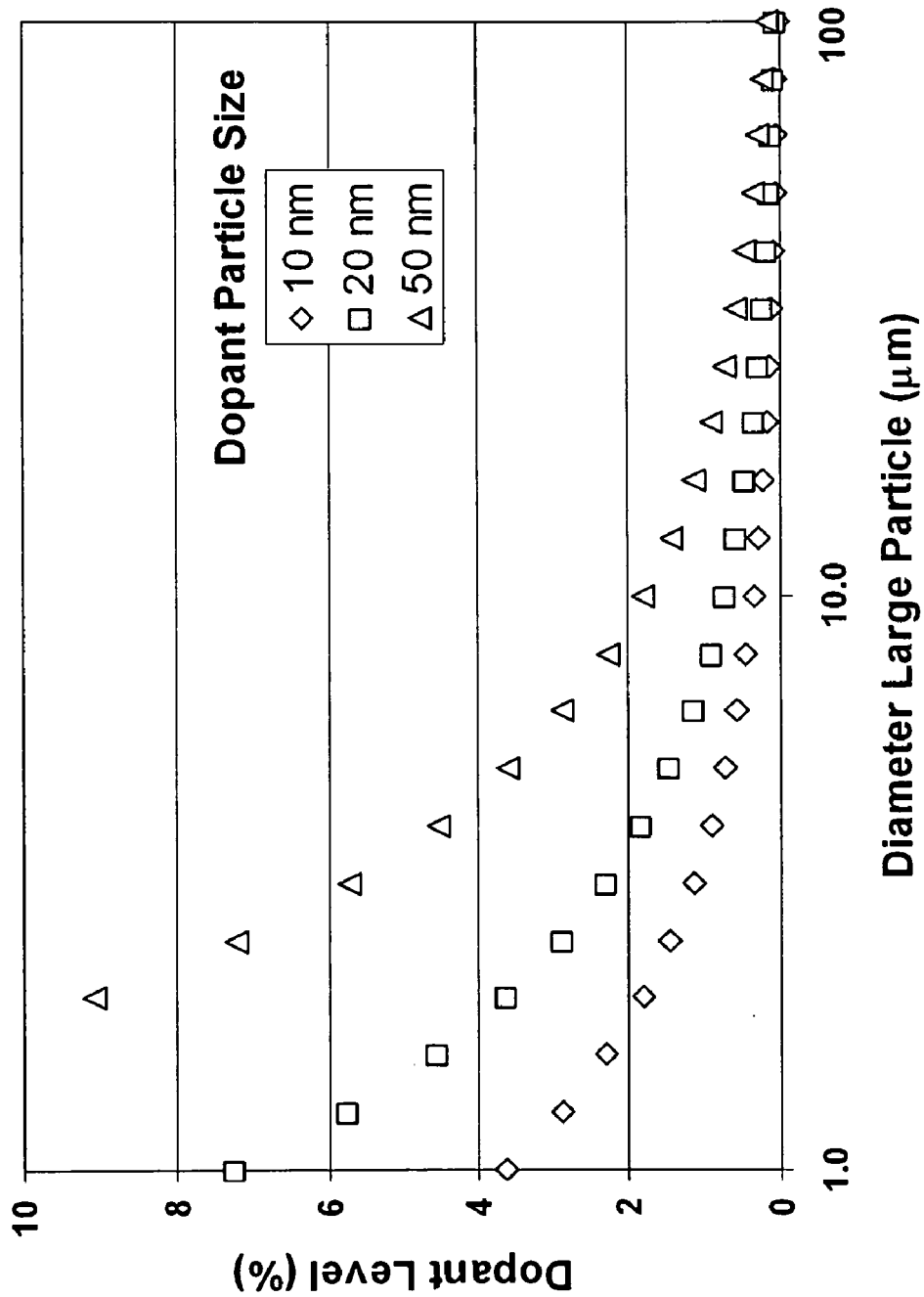
FIG. 5 graphically illustrates a calculated maximum dopant particle level (volume %) as a function of primary matrix particle size and dopant particle size assuming spherical particles and monolayer coverage of the dopant particles on the primary matrix particles.

In operation, individual suspensions of alumina particles 10 and colloidal silica particles 15 are maintained at an appropriate pH, typically between pH 3.0 to 4.5 (see FIG. 3) and are blended together 50, typically with agitation 55, to allow the silica particles 15 to heterocoagulate 60 on the surface of the alumina particles 10 (see FIGS. 4A-C and 6). This heterocoagulation 60 is driven by the opposite surface charges between the alumina and the colloidal silica—the alumina is positively charged in this pH range, while the colloidal silica is negatively charged. After composite particles 20 are formed through coagulation 60, the pH of the suspension is adjusted 65, typically through the addition of such buffer chemicals 70 as NaOH, $NH_4OH$, or the like, to move the pH of the solution to between about 7.0 and about 9.0. Typically, the mixture is simultaneously vigorously agitated to prevent the formation of regions of excessively high pH to yield a stable suspension 77. The increase in pH creates a uniform negative charge on the colloidal silica coating 25, obscuring the surface chemistry of the alumina particles 10 (FIG. 5). Typically, the mixture pH is maintained below about 9.0, as higher pH will potentially reduce the suspension stability and the pot lifetime. The amount of silica 15 typically required to coat the alumina particles 10 can be calculated assuming a hexagonal close-packed array of spheres, although this may over-estimate the coating efficiency. Typically, excess colloidal silica particles 15 are added to ensure that all of the alumina particles 10 are entirely coated. The excess colloidal silica 15 does not significantly affect the long-term stability of the suspension 77.

As with the previous embodiment, the heterocoagulation 60 step may be performed first, followed by the addition of a cationic polyelectrolyte 80, such as tetraethylamine (TEA), to impart a positive surface charge on the composite particles 20 (with the colloidal silica surface shells 25). The advantage of the addition of a cationic polyelectrolyte 80 is that the system 5 will typically not be as sensitive to cations in solution, since the surface charge will be positive instead of negative (as is imparted by the high-pH approach). Again, the pH of the system 5 typically does not exceed about 9.0 to ensure stability of the alumina particles 10.

Typically, fine-grained or coarse-grained cristobalite particles 67 are introduced following the heterocoagulation 60 and stabilization 65 steps and, more typically, are introduced with vigorous agitation. For large grain size cristobalite 67, particle size typically is selected to approximate that of the composite grain 20 (typically 14-16 µm). If a fine-grained cristobalite 67 is chosen, grain size is typically approximately seven times smaller than the composite grain 20, on the order of 2.0 µm. The cristobalite grains 67 are added to exploit the volumetric change in the grains 67 caused by the β- to α-cristobalite inversion (typically at 225-250° C.). This displacive transformation is rapid and reversible, and is sufficiently large to initiate micro-cracking of a coating or body 190 cast or otherwise formed 185 from the slurry or suspension 77, and thus facilitate the coating removal from a cast metal part 210. (See FIG. 6). Typically, larger cristobalite grains 67 are favored for this purpose, although smaller grain sizes will also work. Additionally, fine-grained cristobalite particles 67 provide for better packing by filling in the voids between the larger composite particles 20 and still facilitate cracking 205 of a body 190 formed therefrom upon cooling, thus assisting removal of the ceramic shell 190 by cracking it to pieces 215.

For example, a stucco shell 190 may be formed by casting 185 the slurry 77. The shell 190 may be filled 200 with molten metal 195 to yield a cast metal body 210. The heat of the metal 195 raises the temperature of the cristobalite particles 67 past their transition point, and, upon cooling, the particles 67 once again change phase. The volumetric changes accompanying the phase changes crack the shell 205, causing it to readily crumble into pieces 215 and facilitate easy removal of the cast metal body 210.

Some systems are sensitive to the presence of water, and may even be intolerant of water contamination. Thus, non-aqueous suspension media are typically employed for such systems. While discussed above in relation to aqueous systems, in which the suspension medium (water) is inherently very polar, the novel technique may also apply to non-aqueous suspension systems 305, such as used for diamond processing. These non-aqueous systems 305 offer their own set of challenges. There is an inherent tendency to form surface charges on particles even in non-aqueous mediums that may be exploited to promote heterocoagulation by maintaining opposite charges on the primary particle 310 and the smaller secondary or dopant particle 315 to create "mono-layer" dopant particle coatings 325 to form composite particles 320. The process involves the creation of two suspensions 340, 345 which are then blended together to promote heterocoagulation. This may be done by identifying a single solvent 347 that produces opposite charges on the primary particles 310 and on dopant particles 315 or by identifying compatible solvents that will produce opposite charges on the primary and dopant particles.

Figure 7:
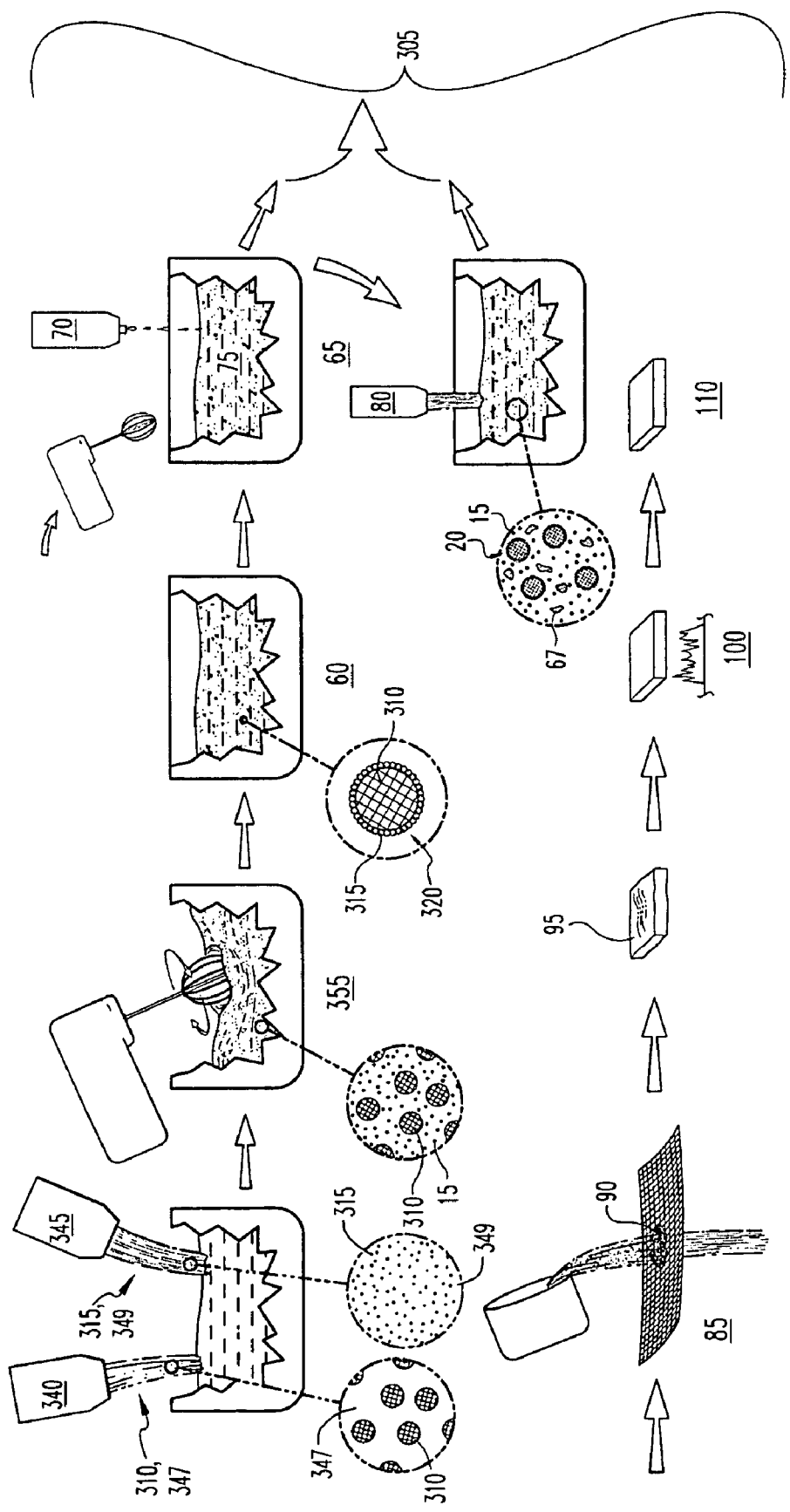
FIG. 7 graphically illustrates another embodiment of the present novel technology, a process for heterocoagulating composite particles and forming bodies from the same using non-aqueous suspensions.
Figure 8B:
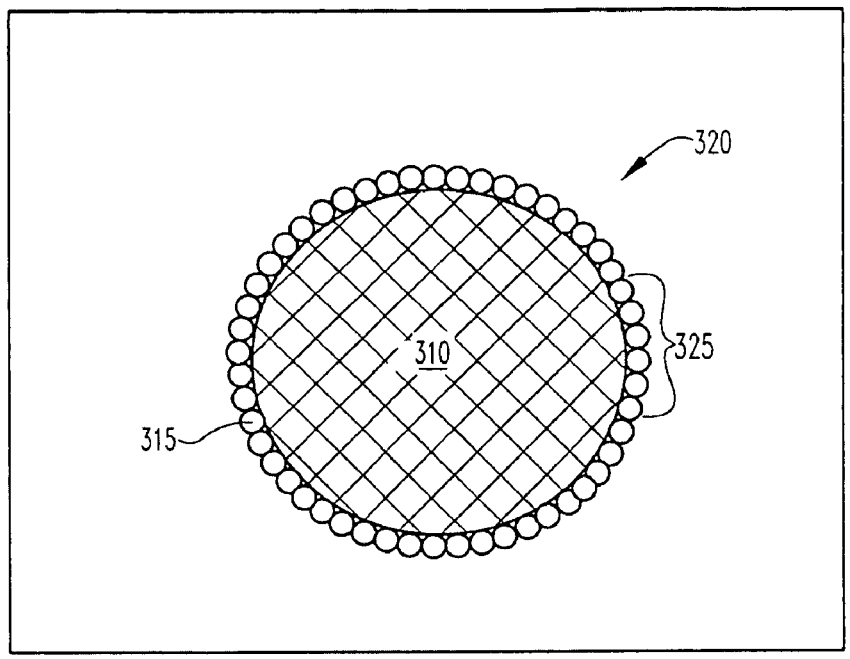
FIG. 8B graphically illustrates a composite particle formed from the blended suspension of FIG. 8A.
Figure 8A:
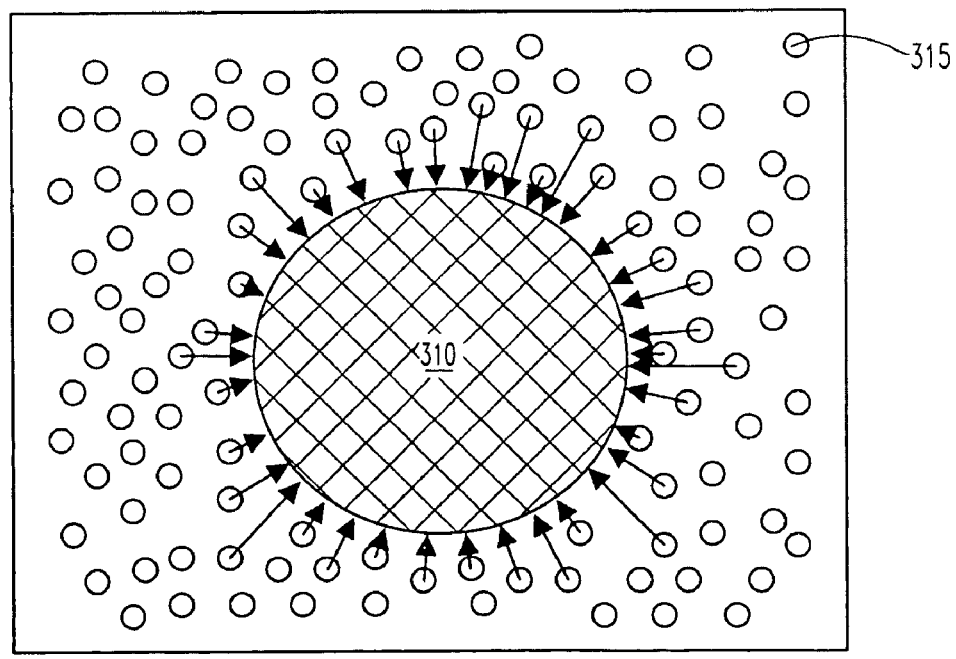
FIG. 8A graphically illustrates a suspension of first and second oppositely charged particles mixed together according to the embodiment of FIG. 7.

Coagulation of particles of different chemistry to promote the uniform distribution of dopants in sintering systems is discussed above; in the case of aqueous suspensions (a highly polar suspension medium) this is easily accomplished through the control of pH or through the use of organic acids and bases that are selected depending on their selectivity for the particle surface. As seen in FIGS. 7-8B, the same principles apply in non-aqueous media 347, 349, although non-aqueous systems 305 are typically more complex, since the induction of a charge on a particle surface is less dependent on the polarity of the suspension medium 347, 349.

It is well known that particles 310, 315 in non-aqueous media 347, 349 also develop surface charges. The choice of the suspension medium 347, 349 helps determine the surface charge magnitude and whether the charge is positive or negative. If oppositely charged primary and dopant particles 310, 315 can be prepared in the same solvent 347, this would suffice to induce heterocoagulation. Care must be taken to assure that the particles are dispersed within that medium 347 and form a stable suspension 340. If the particles 310, 315 are not sufficiently charged, they will agglomerate in the suspension 340 and heterocoagulation will occur on clusters of particles 310 rather than individual particles 310, thus potentially obscuring the benefits of the heterocoagulation approach.

In addition, solvents 347, 349 may be blended to tailor the surface charge or to blend primary and dopant particle suspensions 340, 345 prepared in different but compatible solvents 347, 349 to promote heterocoagulation of the particles 310 and the formation of an azeotrope solution 351 after blending.

If monolayer coatings 325 of dopant particles 315 are developed on the primary particles 310, the dopant level in the system 305 is dictated by the particle size ratio of the dopant particles 315 to the primary particles 310. The development of monolayer coatings 325 represents a maximum dopant level desired in the controlled system 305. Additional dopant particles 315 would raise the dopant level, but their dispersion would no longer be controlled and the dopant distribution could become increasingly uneven. If lower dopant levels are required, either the particles 310 can be partially coated 325 or a fraction of the primary particles 310 can be coated 325 then blended with uncoated particles 310. Typically, relatively dilute suspensions 340, 345 are used to reduce the likelihood of bridging coagulation (i.e., dopant particles 315 forming links between primary particles 310 in suspension). In the case of non-aqueous suspensions 340 (and in the case where one of the blended suspensions 340, 345 is aqueous) the formation of azeotropes provides an excellent opportunity for controlling dopant ratios and coating behavior. Azeotrope ratios are readily available in the open literature and also provide a practical indication of solvent 347, 349 compatibility.

It has been observed for carbon black in various suspension media that the $\zeta$-potential can vary substantially in various suspension mediums. Measured $\zeta$-potential of carbon black powders organized with increasing suspension medium polarity is tabulated below. A cursory inspection of this table indicates that $\zeta$-potential does not appear to change predictably with suspension medium polarity. The stability of Si—C—N nanopowders has also been studied and found that the instability of the suspension increased when the polarity of the solvent decreased. The $\zeta$-potential in the organic medium is dependant on the physical and chemical properties of the liquid, such as dielectric constant, functional groups, molecular weight, etc., and the functional groups of the medium have the greatest effect on the $\zeta$-potential. The charge on the particle surface as developed via electron transfer occurs between the medium and the particles based on Lewis acid-base reactions. Depending on the structure of the medium molecules and the surface chemistry, the colloids may act as either a Lewis acid or a Lewis base, thus imparting either a positive or negative surface charge. This charge development is essential for the development of both a stable suspension and the opportunity for heterocoagulation via opposite charges when blending particle suspensions 340, 345.

TABLE I

Measured $\zeta$-potential of carbon black particles in various suspension mediums obtained from electrophoretic light scattering measurements. The table is listed as a function of increasing polarity based on molecules in the gas phase (NSRDS-NBS 10), or in the solvents that were unlisted, the polarity was estimated using molecules of similar structure (denoted with an "*").

| Medium | Zeta-Potential (mV) | Dipole Moment (debyes) |
|---|---|---|
| Heptane | −2.7 | 0.10 |
| Toluene | +20.8 | 0.36 |
| 2-Aminoethanol* | −39.4 | 1.22 |
| THF (Tetrahydrofuran) | −124.9 | 1.63 |
| 2-Butanol* | −59.4 | 1.65 |
| Isopropanol | −71.1 | 1.66 |

TABLE I-continued

Measured ζ-potential of carbon black particles in various suspension mediums obtained from electrophoretic light scattering measurements. The table is listed as a function of increasing polarity based on molecules in the gas phase (NSRDS-NBS 10), or in the solvents that were unlisted, the polarity was estimated using molecules of similar structure (denoted with an "*").

| Medium | Zeta-Potential (mV) | Dipole Moment (debyes) |
|---|---|---|
| Ethanol | −44.9 | 1.69 |
| Methanol | −28.5 | 1.70 |
| Water | 29.4 | 1.85 |
| 2-Butanone | −87.7 | 2.76 |
| Acetone | −66.5 | 2.88 |
| Formamide | −26.0 | 3.73 |
| N,N-DMF (Dimethylformamide) | −61.6 | 3.86 |
| Nitrobenzene | +45.6 | 4.22 |
| Dimethyl Sulfate* | +13.6 | 4.49 |

EXAMPLE 1

Diamond Coatings

Diamond particles 10 are coated with carbide-forming fine metal particles 15 such as cobalt, tungsten, or molybdenum by preparing a first diamond-containing suspension 40 and a second metal particle suspension 15. Alternately, the smaller particles 15 may be metal oxides. The pH values of the suspensions 40, 45 are controlled such that the suspended particles 10, 15 have opposite charges. The suspensions are blended and composite particles 20 are formed wherein a diamond particle 10 is coated with fine metal particles 15. Typically, the metal particles define a substantial monolayer on the core diamond particle 10. The composite particles 20 may then be formed into a compact 95 and fired 100 to yield sintered, densified bodies 110. Similarly, metal nitride compacts 95, such as those formed from boron nitride particles 10 coated with smaller particles 15 (of metal, metal oxide, metal nitride, metal carbide or like composition) may be formed and processed as described above.

Figure 9:
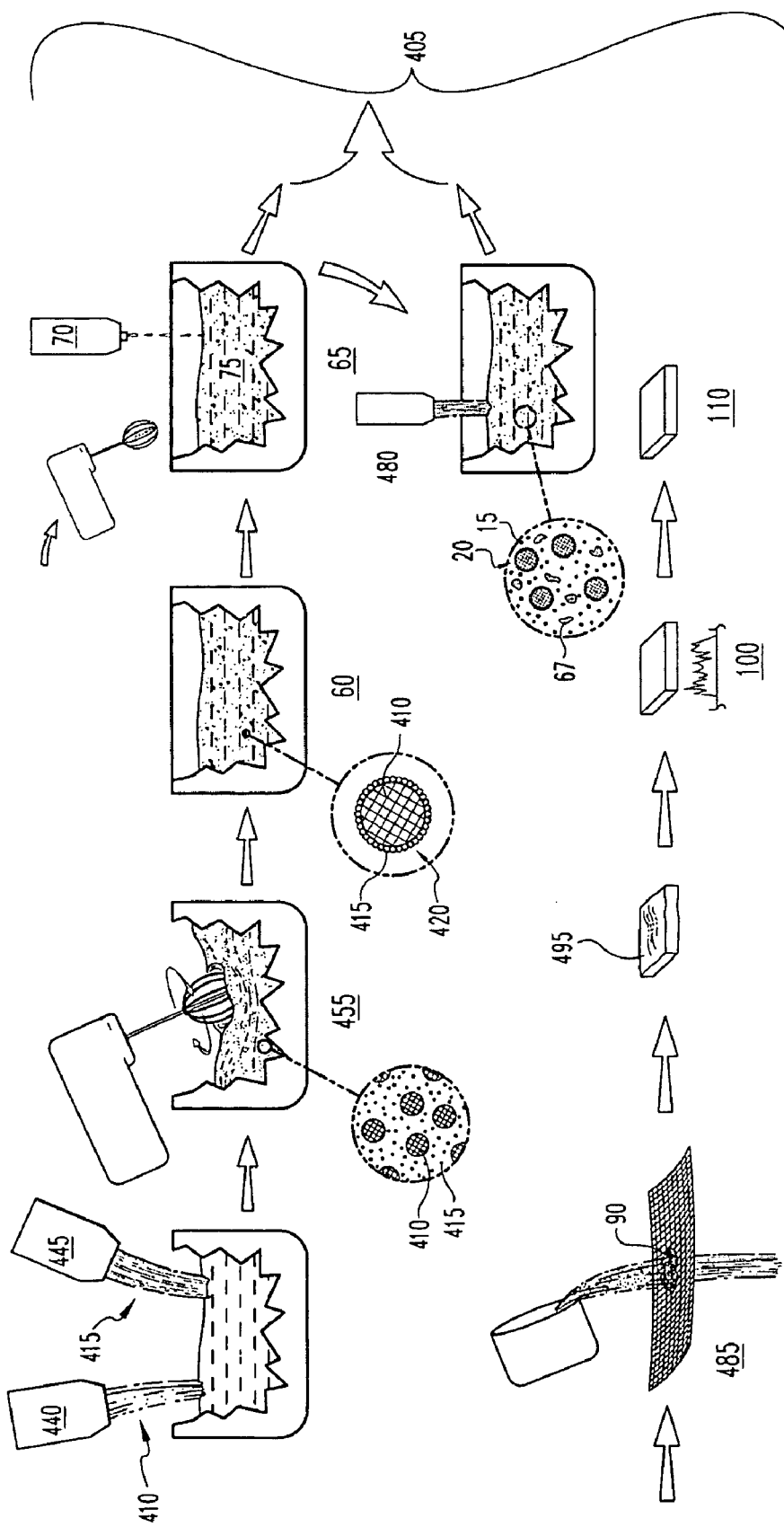
FIG. 9 graphically illustrates another embodiment of the present novel technology, a process for heterocoagulating composite particles formed of large and small precursors of like chemistry and forming bodies from the same.
Figure 10B:
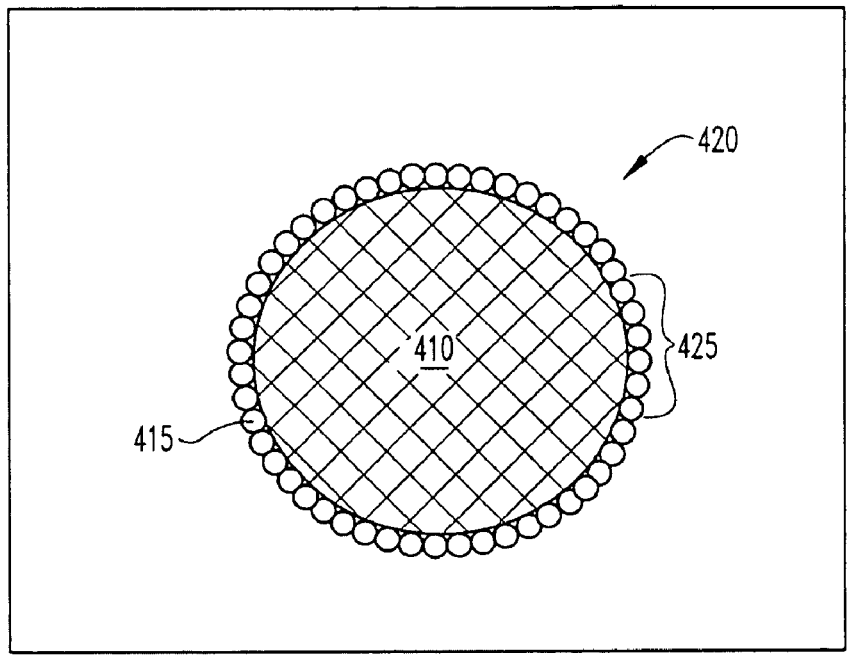
FIG. 10B graphically illustrates a composite particle formed from the blended suspension of FIG. 10A.
Figure 10A:
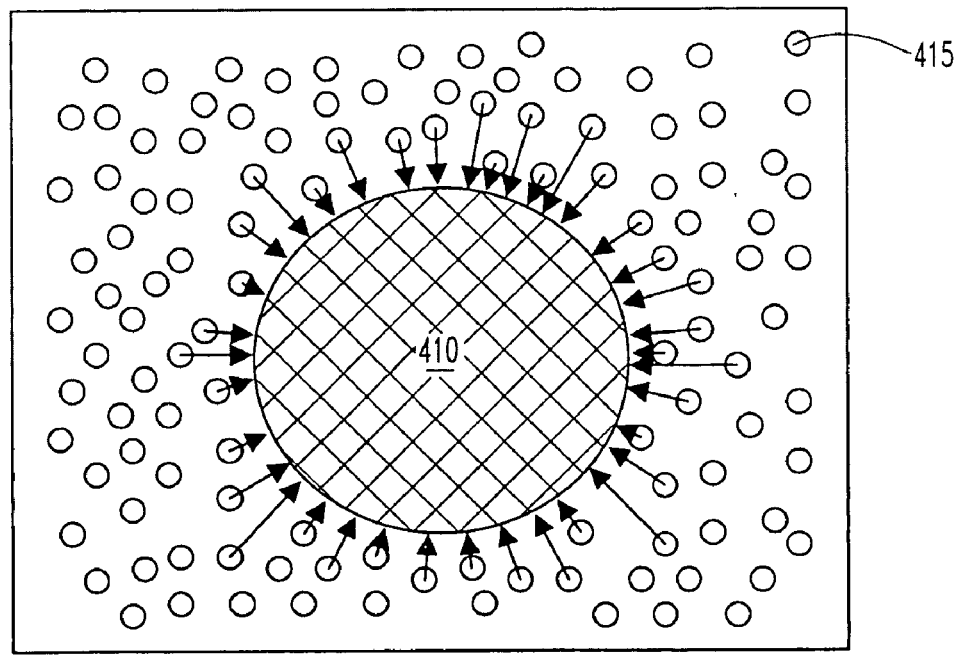
FIG. 10A graphically illustrates a suspension of first and second oppositely charged particles mixed together according to the embodiment of FIG. 9.

Similar Coatings:

The coating of a particle 10 of one chemistry onto another particle 15 of a different chemistry is discussed in detail above. However, as illustrated in FIGS. 9-10B, it is also possible to coat a first particle 410 with a second, smaller particle 415 of similar or identical chemistry to facilitate sintering of the system 405. Since sintering is driven by the reduction in surface area, the smaller particle 415 sinters at a lower temperature than necessary to sinter the larger particles 410. Coating a larger particle 410 with a smaller particle 415 thus allows for sintering and densification to occur at the temperature necessary to sinter the smaller particle 415. Densification could then be accomplished without significant grain growth of the larger particle 410 and potentially with significantly less shrinkage of the so-formed body 495.

The coating process 425 proceeds as outlined above regarding systems 5 of different chemistries. Suspensions 440, 445 of large and small particles 410, 415 would be prepared independently. The use of a polyelectrolyte dispersant on the large particle 410 imparts a charge and the adjustment of pH in the suspension of smaller particle 415 induces an opposite charge thereon. The two suspensions 440, 445 are blended 455 to allow heterocoagulation to occur.

In one specific example, poly (acrylic acid), acetic acid, or citric acid may be used to coat the larger alumina particle 410 (typically at a level of 0.7 mg/m$^2$ at pH=4.5) thus imparting a negative charge on the coated alumina particle 420. A suspension 445 of smaller alumina particles 415, processed at a pH of 4.5, would yield a suspension 445 positively charged alumna particles 415. Upon blending 455 the two suspensions 440, 445, the smaller and larger particles 415, 410 are heterocoagulated to form a coated composite particle 420 defined by a substantial monolayer 425 of small particles 415 on the larger particle 410. The blended suspension 475 remains stable and may be screened, filter pressed or the like 485 to remove excess water.

Conversely, the smaller particles 415 could be treated with PAA, acetic acid, or citric acid 419 to impart a negative charge thereonto, while the larger particles 410 could be processed electrostatically (via pH adjustment to a pH of 4.5) to produce a positive charge on the large particles 410. Again the two suspensions 440, 445 may be blended together 455 to allow the small particles 415 to coat the larger particles 410. A similar route may be used to produce nano-coatings of similar chemistry particles either in an aqueous medium or a non-aqueous medium, for virtually any ceramic or powder metal system.

The novel technology discussed herein may also be used to control the porosity of the so-formed sintered bodies 110. The pore size distribution in a sintered, densified body 110 (or in green bodies 90) is controlled by the packing efficiency of the large particles 10 while the fine particle coating 15 allows sintering to occur at temperatures substantially below that necessary to sinter the larger particles 10. The mean pore size is dictated by the size of the large particles 10, insofar as bodies made up of larger particles have larger pores. By reducing the effective sintering temperature, the larger particles 10 will not experience as much grain growth and the pores inherent in the system will remain small or even shrink as the smaller particles 15 sinter.

Moreover, the above described technique may be employed to distribute catalytically active materials 15 on a substrate 10. The substrate 10 can be an extruded honeycomb structure, an extruded fibrous microstructure honeycomb structure, an extruded packed bed catalyst support, a reticulated (foam) substrate, a metallic foam, wool, or other structure, or the like. The substrate 10 can be any material, including but not limited to alumina, mullite, SiC, Si3N4, zirconia, silica, titania, stainless steel, titanium, etc. The coating particles 15 can be alumina, yttria, titania, silica, zirconia, SiC, cobalt, nickel, cerium oxide, or the like. For coating any of these systems, a dilute suspension 45 of coating particles 15 is typically used, typically between 5 and 10%. In the case of coating catalyst substrates 10, the use of a dilute suspension 45 minimizes the clogging of pores and maximizes the available area for catalytic activity.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

I claim:

1. A method of processing powders, comprising:
providing a plurality of first particles of a first composition, wherein the first particles are characterized by a first average size;
providing a plurality of second particles of a second composition, wherein the second particles are characterized by a second, smaller average size;
mixing the first and second particles in an environment wherein the first particles have a first charge sign and the second particles have a second, opposite charge sign;
coating the first particles with the second particles to yield a plurality of coated composite particles;
wherein the respective coated composite particles are substantially the same size;
wherein the second size is smaller than the first size;
wherein there are enough second particles to coat the first particles; and
wherein the first particles are chemically identical to the second particles.

2. A method of processing powders, comprising:
providing a plurality of first particles of a first composition, wherein the first particles are characterized by a first average size;
providing a plurality of second particles of a second composition, wherein the second particles are characterized by a second, smaller average size;
mixing the first and second particles in an environment wherein the first particles have a first charge sign and the second particles have a second, opposite charge sign;
coating the first particles with the second particles to yield a plurality of coated composite particles;
forming a quantity of the coated particles into a green body; and
heating the green body to a first temperature sufficient to produce a substantially homogeneous body;
wherein the respective coated composite particles are substantially the same size;
wherein the second size is smaller than the first size;
wherein there are enough second particles to coat the first particles;
wherein the first temperature is sufficient to sinter the second particles; and
wherein the first temperature is insufficient to sinter the first particles.

* * * * *